UNITED STATES PATENT OFFICE.

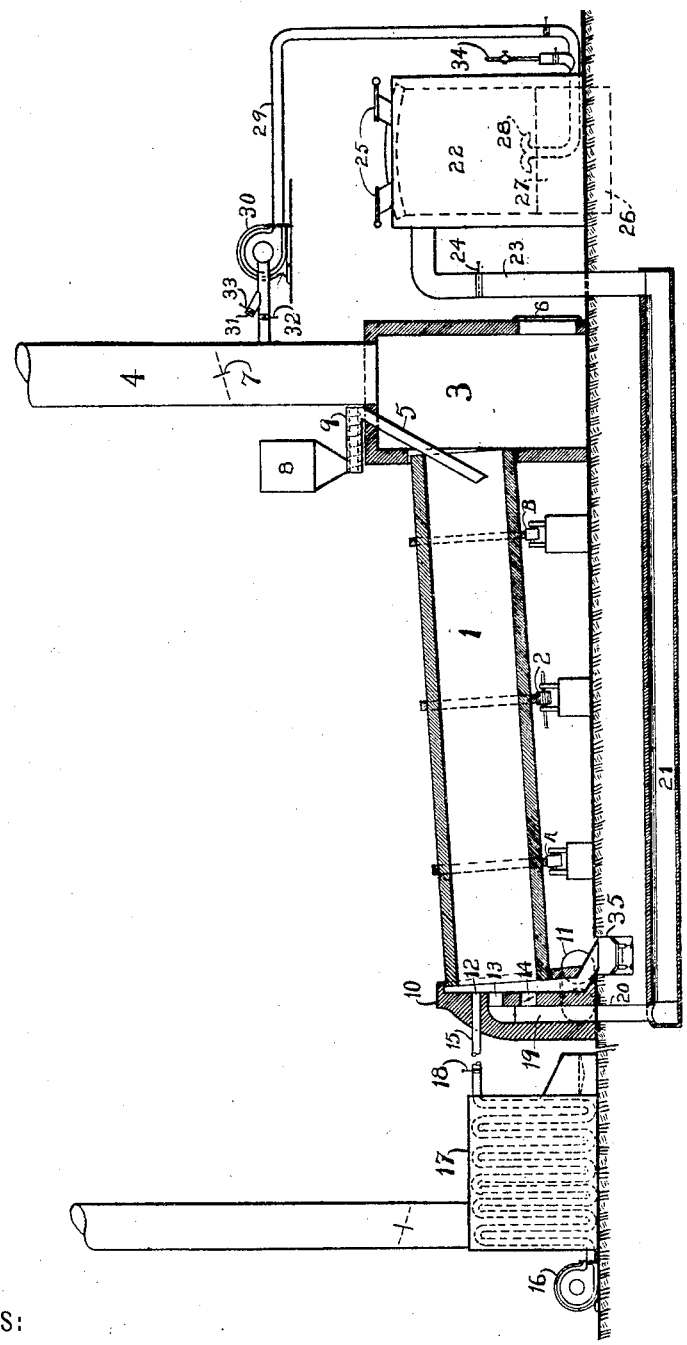

CARLETON ELLIS, OF NEW YORK, N. Y.

TREATMENT OF IRON ORES, &c.

No. 803,886.　　　Specification of Letters Patent.　　　Patented Nov. 7, 1905.

Application filed June 5, 1905. Serial No. 263,889.

*To all whom it may concern:*

Be it known that I, CARLETON ELLIS, a citizen of the United States, and a resident of New York city, in the county of New York and State of New York, have invented certain new and useful Improvements in Treatment of Iron Ores, &c., of which the following is a specification.

This invention relates to process for the manufacture of metallic iron which dispenses with the cupola or blast furnace.

There are many ores of iron which cannot be economically or satisfactorily reduced in the cupola-furnace; and the present process has for its object the manufacture of iron or steel, preferably in a continuous manner, by the employment of a combination of flames which have sufficient reducing action to effect the reduction of the oxid of iron to the metallic state and which at the same time have sufficient heat intensity to afford an output of commercial significance.

It has been proposed to manufacture iron by feeding the ore through a rotary kiln somewhat resembling those used in the manufacture of cement and to apply to the ore a reducing-flame produced from pulverized fuel. Inasmuch as it is necessary in order to secure a complete reduction to have the flame of high temperature and at the same time of a reducing nature, (two properties which are incompatible,) it has not been possible to successfully manufacture iron in this manner. Ordinarily only ten to fifteen per cent. of the ore is reduced, and being mingled with so large an amount of inert matter the separation of the metal from the dross is practically impossible.

In carrying out the present process, rotary kilns may also be employed; but the flame application is made such that the high temperature required is accompanied by a powerful reducing action which permits of the practically complete reduction of the ore. This is accomplished by the employment of two or more flames or flame strata, one portion, that coming in contact with the ore, containing an excess of combustible matter—such, for instance, as carbon monoxid—and therefore having marked reducing properties, while another portion of the flame, more remote from the ore mass, is maintained at a high temperature due to the presence of plenty of oxygen or air.

By reference to the accompanying diagrammatic drawing it will be evident in what manner this process may be carried out.

In the drawing, 1 is a rotary kiln or barrel having a thick lining of refractory material and mounted on rollers. It is rotated by the mechanism 2. In its upper part is a chamber or housing 3, supporting the stack 4, and through which projects into the upper part of the kiln the feeding-spout 5. In the lower part of the housing is the cleaning-door 6. The stack 4 is supplied with a damper 7.

8 is a feed-hopper from which by means of a conveyer 9 the ore is delivered to the spout 5 and falls to the lower part of the kiln-barrel. The lower end of the kiln is closed by the header 10, which is supported on the truck 11. In the kiln are the openings or ports 12, 13, and 14. The port 12 has connection with the pipe or conduit 15, through which fresh air is supplied by the fan 16. Interposed in this conduit is shown a heating-stove 17. This conduit 15 is equipped with the damper 18.

19 is a vertical passage having connection with the ports 13 and 14. This passage communicates with the flues 20 and 21, through which a supply of gas is passed from the gas-producer 22, the "down-comer" 23 of said gas-producer having connection with the horizontal underground flue 21.

24 is a damper in the "down-comer," equipped, as usual, with a sand seal.

In the upper part of the producer are hoppers for the introduction of the fuel. In the lower part is shown a water seal 26, a blast-baffle 27, and twyers 28 for the admission of the air-blast. Connected with the twyers is the conduit 29, which enters the stack 4. Interposed in this conduit is the fan 30. On the inlet side of the fan is an air-opening 31. The valves or dampers 32 and 33 regulate the flow, respectively, of the products of combustion drawn from the stack 4 and of the air admitted through the opening 31. In the conduit 29 is also located a steam-jet 34. At the discharge end of the kiln underneath the header is shown the conveyer-trough 35.

My method of operation is as follows: Iron ore mingled, if desired, with any suitable flux or with carbonaceous material is fed from the hopper 8 into the kiln in its upper part, and as the kiln rotates the material moves gradually toward the lower end. Through the port 12 a supply of air, preferably highly heated, is admitted to the kiln and through the ports 13 and 14 a stream of combustible gas. That issuing from the port 13 mingles with the air from the port 12, and a flame of very high temperature is produced, which heats up the thick walls of the kiln-barrel and by virtue of its heat-radiating qualities reverberates an intense heat upon the mass of ore in the bottom of the kiln. Through the port 14 only producer-gas issues, and owing to its high content of carbon monoxid the atmosphere around the material is of a strongly-reducing nature. By virtue of the heat radiation from the flame above and from the kiln-lining and by heat conducted from the kiln-lining to the material by contact as the kiln revolves, in conjunction with the reducing action above mentioned, the ore is rapidly deprived of its oxygen, and the iron therein contained is thereby rapidly and completely converted to the metallic state, whereupon the ore discharges into the conveyer and is taken to any desired point for further treatment. It is desirable to have the gas which enters at 14 of such a temperature that its gravity is greater than the air entering the port 12, thereby preventing the too rapid mingling of these two currents. In that way the reducing-current will travel a long distance into the kiln before it mixes with sufficient air to exert an oxidizing action, and by that time it will ordinarily have reached the upper portion of the kiln. By its combustion at this point heat is evolved, which assists in bringing the raw ore to the temperature necessary to effect the proper reduction in the lower portion of the kiln.

The air supplied through port 12 may be heated in any suitable manner. For instance, a continuous regenerator may be placed in the stack or housing, or the products of combustion may be drawn from the housing and passed through a reversing-regenerator or continuous recuperator, as desired. Another method of preheating the air, which is not as efficient as those above mentioned, is that of placing tubes or passages alongside the gas-flues and in thereby transferring a portion of the heat of the gas to the entering air. In this case it is, however, difficult to bring the air to such a temperature that the proper stratification of the flame-currents is secured.

It is obvious that other fuels than producer-gas may be used—as, for instance, water-gas, natural gas, oil, or pulverized coal or combinations of these. For instance, the flame from the upper part of the header may be developed by powdered coal, while that from the lower part of the header may be developed by the use of oil or producer-gas.

The operation of the gas-producer by products of combustion requires the proper proportioning of carbon dioxid and oxygen to secure a temperature at which the coal does not fuse or clinker in the producer. A steam-jet has also been shown, as it is sometimes desirable to operate with steam or air or with steam, air, and products of combustion, depending to some extent on the nature of the ore.

It will be evident that any method involving the use of a single jet of flame is incapable of giving simultaneously the desired heating and reducing action. To produce a flame of a reducing character, insufficient oxygen for combustion should be supplied. This results in a flame of low temperature, which cannot impart heat with sufficient rapidity to the ore mass to bring about rapid and complete reduction. Consequently with a single flame it has been found by experiment that a very small output of only partially-reduced ore is obtained. The present process involving, as it does, the use of two or more flames so located with reference to the ore that the reducing-flame or reducing-current is between the heating-flame and the ore makes it possible to secure the high heat intensity necessary for rapid deoxidation, and consequently permits of the treatment of ores in such quantities that the process is of great commercial importance.

What I claim is—

1. Process for reducing iron ores which consists in treating a progressively-advancing stream of the ore with a flame of high heat intensity and in interposing between said flame and ore a flame or current of a reducing character.

2. Process for manufacturing metallic iron which consists in treating a progressively-advancing stream of finely-divided ore with a high-temperature flame, and in interposing between said high-temperature flame a stratum of a reducing-gas.

3. Process for manufacturing metallic iron which consists in treating a progressively-advancing stream of finely-divided ore with a high-temperature flame, and in interposing between said high-temperature flame a stratum of producer-gas.

4. Process for manufacturing metallic iron which consists in subjecting an ore of iron to a flame of high heat intensity and in interposing between said flame and ore a flame or current of a reducing character.

5. Process for manufacturing iron which consists in subjecting an ore of iron in combination with a flux to a flame of high heat intensity and in interposing between said flame and ore a flame or current of a reducing character.

Signed at New York city, in the county of New York and State of New York, this 17th day of May, A. D. 1905.

CARLETON ELLIS.

Witnesses:
CHAS. E. BROWN,
ARTHUR E. WHITE.